Jan. 25, 1938.   H. ZORN ET AL   2,106,232
PRODUCTION OF HIGH QUALITY LUBRICATING OILS
Filed Oct. 4, 1933
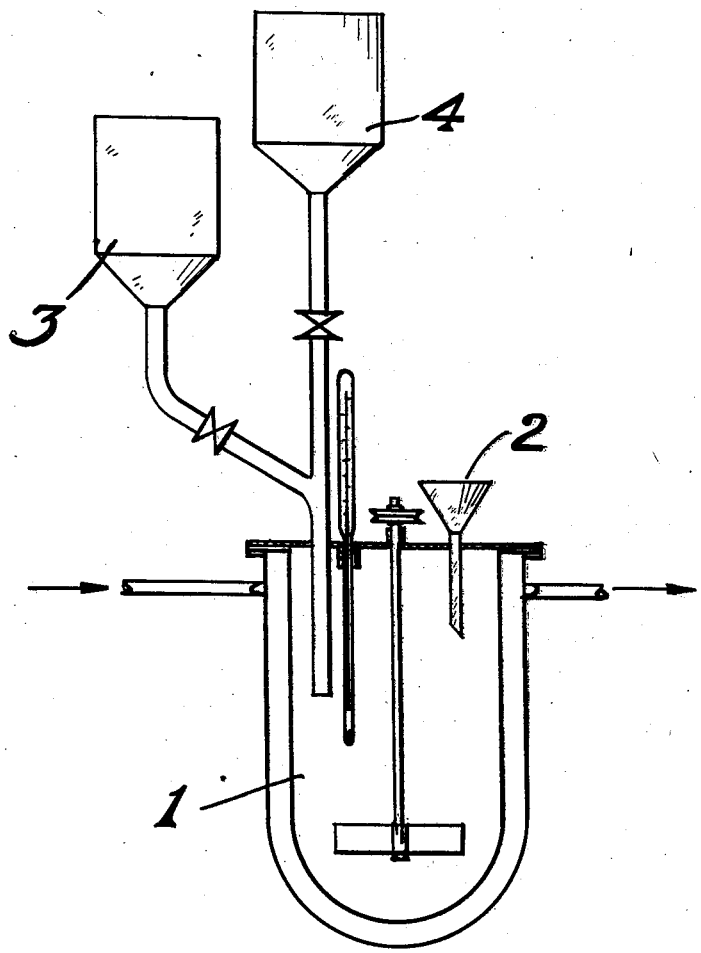
Walter Rosinsky
Herman Zorn Inventors
By P. L. Young Attorney Patented Jan. 25, 1938

2,106,232

UNITED STATES PATENT OFFICE 2,106,232

PRODUCTION OF HIGH QUALITY LUBRICATING OILS

Hermann Zorn, Ludwigshafen-on-the-Rhine, and Walter Rosinsky, Oppau, Germany, assignors to I. G. Farbenindustrie Aktiengesellschaft, Frankfort-on-the-Main, Germany Application October 4, 1933, Serial No. 692,130
In Germany October 15, 1932

5 Claims. (Cl. 196—78)

The present invention relates to the production of high quality lubricating oils.

We have found that very valuable and high quality lubricating oils are obtained by adding to hydrocarbon oils, as for example mineral and tar oils, destructive hydrogenation products of coals, cracking and destructive hydrogenation products of mineral and tar oils and of fatty oils and their extraction and distillation products, polymerized isobutylene, advantageously highly polymerized isobutylene, the resulting solutions being subjected to a treatment with condensing or polymerizing agents. The peculiar property of the polymerized isobutylene, especially of the highly polymeric product, of being capable of flattening the temperature-viscosity curve is considerably increased by the said treatment with condensing agents. For example an isobutylene polymerization product of high molecular weight when dissolved in an amount of 1 per cent in lubricating oil having a viscosity index of 55, imparts to the lubricating oil a viscosity index of 90 and a viscosity of 2.4° Engler at 99° C. If this solution be treated with aluminium chloride, an oil having a viscosity index of 100 and a viscosity of 2.2° Engler at 99° C. is obtained. Thus an improvement in the temperature-viscosity curve of the oil takes place without the viscosity of the oil being increased at the same time. This would take place, however, if the improvement in the viscosity index were effected by the addition of further amounts of the highly polymerized additional substance. Up to 30 per cent and more of the polymerized isobutylene may be added to the oils to be improved, depending on the desired effect and the nature of the oil, but amounts of from 0.1 to 10, preferably from 0.5 to 2 per cent are usually sufficient.

The anhydrous halides of the Friedel-Crafts type, such as the anhydrous chlorides of aluminium, zinc, tin and iron are suitable, for example, as condensing or polymerizing agents. They are usually employed in amounts of from 0.5 to 10, preferably from 1 to 3, per cent, with reference to the oil mixture to be reacted upon. Their action is promoted by vigorous stirring to effect a thorough mixing and by the employment of increased temperatures. The viscosity index and the viscosity of the products resulting from the treatment are dependent on a temperature optimum which may be readily ascertained for each initial material by a simple preliminary experiment. In most cases the most favorable temperatures are between 40° and 80° C., but also higher or lower temperatures, for example between 10° and 110° C., may be satisfactorily employed.

Mineral oils, tar oils, oils derived from the destructive hydrogenation of coals, their distillation, extraction, cracking and destructive hydrogenation products and fractions containing low to high boiling unsaturated hydrocarbons, such as benzines, middle oils, gas oils and lubricating oils, are suitable as initial materials. Cracking products of fatty oils and their dehydrated destructive hydrogenation products are also suitable. Mixtures of the said initial materials may also be employed.

The reaction may be carried out in a great variety of ways. For example the additional substance of high molecular weight may be dissolved in a lubricating oil to be improved, the condensing or polymerizing agent added, the whole warmed and stirred for some time and the condensing or polymerizing agent separated either by sedimentation and decanting or by washing out with water. A part of the initial material, as for example a half, may also be partially polymerized or condensed alone, then mixed with the other half containing the additional substance of high molecular weight in solution and the polymerization or condensation process being completed. This method of working is especially suitable when employing or co-employing cracking products, in particular those of hard or soft paraffin wax or of petrolatum or crude paraffin wax. The condensing agent, as for example aluminium chloride, may then be added to the cracking product, as for example of paraffin wax, and the whole stirred for some time, as for example an hour. Heating spontaneously occurs because the reaction proceeds exothermically. The lubricating oil fraction of a mineral or tar oil is then added in which the high molecular additional substance has previously been dissolved, and stirring is continued for some time while heating. When employing aluminium chloride as the condensing agent, lubricating oil fractions which have not been purified and which still contain asphaltic substances may be employed, the known purifying action of aluminium chloride being thus utilized at the same time. The asphaltic impurities of the original oil are contained in the aluminium chloride sludge which separates at the end of the reaction and may be removed from the oil by decantation.

The accompanying drawing represents diagrammatically one form of apparatus which is suitable for carrying out the process according to this invention. In the drawing, I indicates a jacketed reaction vessel provided with a stirrer and a thermometer. The condensing agent, as for example aluminum chloride, is charged into the vessel I by way of a hopper 2, while the hydrocarbon oil capable of undergoing polymerization is supplied from a tank 3 and the polymeric isobutylene, preferably in the form of a solution from a tank 4.

The lubricating oils distinguished by a particularly flat temperature-viscosity curve thus obtained may have added thereto if desired substances which lower the setting point, as for example those obtained according to the German Patent No. 556,309. If desired, substances improving the viscosity may also be added, as for example condensation products from paraffinic hydrocarbons, or natural or synthetic rubber, or polymerized styrene.

The following examples will further illustrate the nature of this invention but the invention is not restricted to these examples. The parts are by weight.

Example 1

1 part of the product obtained by the polymerization of isobutylene by means of boron fluoride at low temperature is added to 100 parts of a lubricating oil fraction of a German petroleum and having a viscosity of 14.2° Engler at 38° C. and of 1.80° Engler at 99° C. and a viscosity index of 55. An oil is obtained having a viscosity of 24.1° Engler at 38° C. and 2.39° Engler at 99° C. and a viscosity index of 91. If 2 parts of aluminium chloride be added to the solution and the whole heated for 2 hours at 80° C. while stirring, an oil is obtained having a viscosity of 18.8° Engler at 38° C. and 2.22° Engler at 99° C. and a viscosity index of 99.3.

Example 2

100 parts of a product boiling between 30° and 220° C. obtained by cracking hard or soft paraffin wax at about 540° C., are treated while stirring with 2 parts of anhydrous aluminium chloride for 2 hours at 60° C. 400 parts of an unrefined lubricating oil fraction of a German petroleum in which 5 parts of polymerized isobutylene (see Example 1) are dissolved are then added and the whole stirred for an hour at 80° C. The aluminium chloride sludge formed is allowed to settle, the lubricating oil decanted and treated with 2 per cent of bleaching earth. After filtering off the latter, 420 parts of a lubricating oil are obtained having a viscosity of 23.9° Engler at 38° C. and of 2.85° Engler at 99° C. and a viscosity index of 121. By working without the addition of the polymerized isobutylene, a lubricating oil is obtained having a viscosity of 15.8° Engler at 38° C. and of 2.04° Engler at 99° C. and a viscosity index of 95. If in this lubricating oil there be dissolved the same amount of polymerized isobutylene as has been added during the condensation already described, an oil is obtained having a viscosity of 26.4° Engler at 38° C. and of 2.63° Engler at 99° C. and a viscosity index of 105.

If, instead of the lubricating oil fraction of a German petroleum, 200 parts of the corresponding fraction of a destructive hydrogenation product of brown coal tar be employed, oils are obtained as already described having the following viscosity characteristics:

(a) oil and polymerized isobutylene polymerized or condensed together: viscosity 23.8° Engler at 38° C. and 2.56° Engler at 99° C.; viscosity index 108.

(b) oil without polymerized isobutylene: viscosity 13.35° Engler at 38° C. and 1.90° Engler at 99° C.; viscosity index 89.3.

(c) polymerized isobutylene subsequently dissolved in the oil: viscosity 26.2° Engler at 38° C. and 2.64° Engler at 99° C.; viscosity index 105.

Example 3

300 parts of a product boiling between 30° and 260° C. obtained by cracking hard or soft paraffin wax at about 540° C. are dissolved in 100 parts of ligroin and stirred with 15 parts of aluminium chloride for 2 hours at 115° C. 3 parts of polymerized isobutylene (see Example 1) dissolved in 100 parts of ligroin are then added and the whole stirred for an hour at 80° C. The aluminium chloride double compound is then decomposed by the addition of water and after distilling off the ligroin and a small amount of first runnings 270 parts of a lubricating oil are obtained having a viscosity of 70.0° Engler at 38° C. and 6.32° Engler at 99° C. and a viscosity index of about 135.

Without adding the polymerized isobutylene, an oil is obtained having a viscosity of 19.7° Engler at 38° C. and 2.43° Engler at 99° C. and a viscosity index of 113. If the corresponding amount of polymerized isobutylene be dissolved in this oil, an oil is obtained having a viscosity of 27.4° Engler at 38° C. and 3.0° Engler at 99° C. and a viscosity index of 118. The product is eminently suitable for improving the temperature-viscosity curve of inferior lubricating oils by mixing therewith. For example, if 20 parts of the product be mixed with 80 parts of a lubricating oil having a viscosity of 1.82° Engler at 99° C. and a viscosity index of 72.7, an oil is obtained having a viscosity of 2.39° Engler at 99° C. and a viscosity index of 101.8.

Example 4

100 parts of a mixture of olefines obtained by the dehydration of the alcohol mixture obtained by the catalytic destructive hydrogenation of soy bean oil (at 200 atmospheres and 230° C. in the presence of copper chromite) are stirred for 2 hours at 60° C. with 6 parts of aluminium chloride. 200 parts of a cracking product boiling between 50° and 300° C. obtained by cracking a gas oil at 480° C. and in which 3 parts of a polymerized isobutylene are dissolved are added and the whole stirred for another hour at 80° C. 140 parts of a lubricating oil are obtained having a viscosity of 56.8° Engler at 38° C. and 5.55° Engler at 99° C. and a viscosity index of about 127. Without the addition of the polymerized isobutylene, an oil is obtained having a viscosity of 20.4° Engler at 38° C. and 2.60° Engler at 99° C. and a viscosity index of 120.6. If the corresponding amount of polymerized isobutylene be dissolved in this oil, an oil is obtained having a viscosity of 29.5° Engler at 38° C. and 3.27° Engler at 99° C and a viscosity index of 121.9.

Example 5

100 parts of a mixture of olefines obtained by splitting off hydrogen chloride from chlorinated paraffin wax are stirred for 2 hours at 30° C. with 8 parts of aluminium chloride.

400 parts of a crude lubricating oil fraction of a German mineral oil in which 5 parts of a polymerized isobutylene are dissolved, are then added to the mixture, the whole then being stirred at 35° C. for 2 hours. The sludge containing the aluminium chloride is allowed to settle and the supernatant layer is filtered through bleaching earth and then freed from any small amount of low boiling constituents by distillation. An oil is thus obtained having a viscosity of 24.8° Engler at 38° C. and of 2.62° Engler at 99° C. and a viscosity index of 116. Without an addition of polymerized isobutylene an oil is obtained having a viscosity of 16.5° Engler at 38° C. and of 2.11° Engler at 99° C. and a viscosity index of 100. When adding polymerized isobutylene after the condensing treatment the resulting oil has a viscosity of 36.2° Engler at 38° C. and of 2.77° Engler at 99° C., and a viscosity index of 111.

What we claim is:—

1. The process of producing lubricating oils which comprises incorporating a high molecular weight polymerization product prepared from isobutylene alone, which product when added to a lubricating oil considerably flattens the temperature-viscosity curve thereof, with a hydrocarbon oil capable of undergoing polymerization and acting on the mixture with a condensing agent of the Friedel-Crafts type at a condensing temperature.

2. The process of producing lubricating oils which comprises acting on a hydrocarbon oil capable of undergoing polymerization with a condensing agent of the Friedel-Crafts type, incorporating a high molecular weight polymerization product prepared from isobutylene alone, which product when added to a lubricating oil considerably flattens the temperature-viscosity curve thereof, with the resulting product and acting on the mixture with a condensing agent of the Friedel-Crafts type at a condensing temperature.

3. The process of producing lubricating oils having a relatively low viscosity and a high viscosity index which comprises mixing a hydrocarbon oil fraction capable of undergoing chemical condensation with a separately prepared substantially pure isobutylene polymerization product of high molecular weight, which polymerization product will materially flatten the temperature-viscosity curve of an oil when added thereto, and subjecting said mixture to condensation in the presence of a Friedel-Crafts condensing agent.

4. The process of producing lubricating oils having a relatively low viscosity and a high viscosity index which comprises mixing a lubricating oil capable of undergoing chemical condensation with a separately prepared substantially pure isobutylene polymerization product of high molecular weight, which polymerization product will materially flatten the temperature-viscosity curve of an oil when added thereto, and subjecting said mixture to condensation in the presence of a Friedel-Crafts condensing agent.

5. A process of producing lubricating oils having a relatively low viscosity and a high viscosity index which comprises subjecting an oil capable of undergoing chemical condensation to condensing treatment in the presence of a Friedel-Crafts condensing agent, thereafter mixing said oil with a substantially pure isobutylene polymerization product of high molecular weight, which polymerization product will materially flatten the temperature-viscosity curve of an oil when added thereto, and subjecting said mixture to further condensation in the presence of a Friedel-Crafts condensing agent.

HERMANN ZORN.
WALTER ROSINSKY.